Patented May 18, 1954

2,678,869

UNITED STATES PATENT OFFICE 2,678,869

CELLULOSE DERIVATIVES

Hermann Schnell, Leverkusen-Wiesdorf, and Heinrich Rinke, Leverkusen-Schlebusch, Germany, assignors to Farbenfabriken Bayer Aktiengesellschaft, Leverkusen, Germany, a corporation of Germany No Drawing. Application December 27, 1950, Serial No. 203,016

Claims priority, application Germany January 2, 1950

9 Claims. (Cl. 18—54)

The present invention relates to cellulose derivatives and more particularly to modified cellulose derivatives showing reduced water absorption and improved electrical insulating properties.

It is known to react cellulose or derivatives thereof containing free hydroxyl groups with monoisocyanates. In order to avoid the formation of ureas which may be easily formed from the isocyanate, the reaction had to be carried out in absolutely anhydrous media while using expensive, difficultly available solvents.

It is an object of this invention to provide a process of producing cellulose derivatives of reduced water absorption and improved electrical insulating properties.

A further object consists in the provision of an improved process of reacting dissolved cellulose derivatives, such as cellulose esters, -ethers or -ether-esters with monofunctional isocyanates.

Another object resides in the provision of catalysts for this reaction.

A still further object consists in a process for producing shaped articles such as filaments, fibers or films having improved tensile strength in the wet state and an improved capacity for electrical insulation.

Still further objects will become apparent as the following specification proceeds.

According to the present invention the reaction of cellulose derivatives and monoisocyanates is accomplished in simple manner by adding to the solution of cellulose derivatives addition compounds prepared from monoisocyanates, such as phenyl-isocyanate, chlorohexyl-isocyanate, stearyl-isocyanate and hydrocyanic acid. If necessary catalytic amounts of tertiary bases such as pyridine, quinoline, pentamethyl-diethylene-triamine etc. are added to the solution. The reaction does not require the solvents or the dissolved cellulose derivatives to be anhydrous or free from other volatile compounds capable of reaction with isocyanates. The organic solvent ordinarily employed in the manufacture of fibers and films from cellulose derivatives, such as acetone, methylene chloride, chloroform, alkylacetates and even alcohols and mixtures thereof may be employed.

The addition product of monoisocyanate and hydrocyanic acid is employed in an amount of from about 5 to about 50 per cent by weight of the cellulose derivative. The amount depends upon the volatility of the isocyanate and the result desired in the final product. Larger amounts may be used without departing from the scope of the invention but are not preferred for economic reasons.

The solutions obtained are extruded as usual to yarns, filaments, fibers, foils or ribbons. The dry articles are subsequently subjected to an after-treatment at temperatures above 100° C., preferably between 140 and 160° C., if necessary under pressure. The isocyanate addition compound decomposes at these temperatures with splitting off free hydrocyanic acid the isocyanate reacting immediately with the hydroxyl-groups in the cellulose derivatives. The articles obtained according to the present invention contain nitrogen; their capacity for absorbing water is substantially reduced and their electrical properties are appreciably improved, so as to render them especially suitable for purposes of electrical insulation.

The invention is further illustrated by the following examples without being restricted thereto.

Example 1

450 parts of cellulose acetate (54% combined acetic acid) are dissolved in 1800 grams of acetone containing 115 grams of the addition compound prepared from phenyl-isocyanate and hydrocyanic acid. The solution is spun through a 16-hole-nozzle (inside diameter 0.07 mm.) in a spinning funnel heated to 80° C. (output per minute 9.3 grams) and drawn off with a speed of 220 m. per minute.

The acetate rayon obtained (total titre 100 den.) is heated on the bobbin at 140° C. for one hour. The tensile strength of the modified rayon in the dry state corresponds to that of untreated acetate rayon. The strength in the wet state is distinctly improved and the water-absorption is reduced. The electrical values of the thread correspond roughly to those of cellulose triacetate.

Example 2

110 grams of cellulose acetate (58% combined acetic acid) are dissolved in a solvent mixture of 495 grams of methylene chloride, 250 grams of chloroform and 18 grams of butyl alcohol containing 10 grams of a dissolved crystallized addition compound prepared from phenyl-isocyanate and hydrocyanic acid, of the melting point 120° C., and 0.1 gram of isoquinoline.

The solution is cast into films (50 $\mu$ thick) and the films are subsequently heated to 70° C. for 30 minutes and to 150° C. for one hour. The films obtained are distinguished by reduced water-absorption.

We claim:
1. A process which comprises dissolving an organic cellulose derivative selected from the group consisting of cellulose esters, cellulose ethers and cellulose ether-esters in an organic solvent therefor, adding to the solution thus formed an addition product of a monofunctional organic isocyanate and hydrocyanic acid, evaporating said solvent and simultaneously shaping an article from said cellulose derivative solution, and heating said shaped article to a temperature of from about 100 to 160° C.

2. A process which comprises dissolving cellulose acetate in an organic solvent therefor, adding to the solution thus formed an addition product of a monofunctional organic isocyanate and hydrocyanic acid, evaporating said solvent and simultaneously shaping an article from said cellulose acetate solution, and heating said shaped article to a temperature of from about 100 to about 160° C.

3. A process which comprises dissolving cellulose acetate in an organic solvent therefor, adding to the solution thus formed an addition product of a monofunctional organic isocyanate and hydrocyanic acid and catalytic amounts of a tertiary organic base, evaporating said solvent and simultaneously shaping an article from said cellulose acetate solution, and heating said shaped article to a temperature of from about 100 to about 160° C.

4. A process which comprises dissolving cellulose acetate having a content of combined acetic acid of about 54 per cent in acetone adding to the solution the addition compound of phenyl-isocyanate and hydrocyanic acid in an amount of from about five to about fifty per cent by weight of said cellulose acetate, dry-spinning the solution to from cellulose acetate rayon and heating said rayon to a temperature of from about 120 to about 150° C.

5. A process which comprises dissolving cellulose acetate having a content of combined acetic acid of about 58 per cent in a mixed organic solvent therefor, adding to the solution the addition compound of phenyl isocyanate and hydrocyanic acid in an amount of from 8 to 12 per cent by weight of said cellulose acetate, casting a film from said solution, evaporating said solvent and heating said film to a temperature of about 120–150° C.

6. A process which comprises dissolving cellulose acetate in acetone, adding to the solution the addition compound of phenyl-isocyanate and hydrocyanic acid in an amount of from about 5 to about 50% by weight of said cellulose acetate, dry spinning the solution to form cellulose acetate rayon and heating said rayon to a temperature of from about 120 to about 150° C.

7. A process which comprises dissolving cellulose acetate in an organic solvent therefor, adding to the solution the addition compound of phenyl-isocyanate and hydrocyanic acid in an amount of from about 5 to about 50% by weight of cellulose acetate, dry spinning the solution to form cellulose acetate rayon and heating said rayon to a temperature of from about 100 to about 160° C.

8. A process which comprises dissolving cellulose acetate having a content of combined acetic acid of about 54% in acetone, adding to the solution the addition compound of phenyl-isocyanate and hydrocyanic acid in an amount of from about 5 to about 50% by weight of said cellulose acetate, dry-spinning the solution to form cellulose acetate rayon and heating said rayon to a temperature of from about 100 to about 160° C.

9. A process which comprises dissolving cellulose acetate having a content of combined acetic acid of about 54% in acetone adding to the solution the addition compound of phenyl-isocyanate and hydrocyanic acid in an amount of from about 5 to about 50% by weight of said cellulose acetate, evaporating said acetone and simultaneously shaping an article from said cellulose derivative and heating said article to a temperature of from about 120 to about 150° C.

References Cited in the file of this patent

UNITED STATES PATENTS

| Number | Name | Date |
|---|---|---|
| 2,277,083 | Dorough | Mar. 24, 1942 |
| 2,370,405 | Kaase | Feb. 27, 1945 |
| 2,495,767 | Reid | Jan. 31, 1950 |